United States Patent
Namiki et al.

(10) Patent No.: US 7,663,776 B2
(45) Date of Patent: Feb. 16, 2010

(54) DOCUMENT PROCESSING APPARATUS AND METHOD

(75) Inventors: Masashi Namiki, Kawasaki (JP); Yasunori Kawanishi, Kawasaki (JP); Shinya Yamaguchi, Yokohama (JP); Junichi Matsuda, Higashimurayama (JP); Shoichi Nakagami, Miyoshi (JP)

(73) Assignee: Hitachi, Ltd., Tokyo (JP)

( * ) Notice: Subject to any disclaimer, the term of this patent is extended or adjusted under 35 U.S.C. 154(b) by 800 days.

(21) Appl. No.: 11/210,733

(22) Filed: Aug. 25, 2005

(65) Prior Publication Data

US 2006/0044619 A1      Mar. 2, 2006

(30) Foreign Application Priority Data

Aug. 26, 2004   (JP)   ............... 2004-246093

(51) Int. Cl.
G06K 15/00 (2006.01)
G06K 9/18 (2006.01)
G06F 17/00 (2006.01)

(52) U.S. Cl. ............ 358/1.16; 382/183; 715/232; 715/233

(58) Field of Classification Search .......... 358/1.1, 358/1.14, 1.15; 715/232, 512, 541
See application file for complete search history.

(56) References Cited

U.S. PATENT DOCUMENTS

2003/0004991 A1* 1/2003 Keskar et al. ............... 707/512
2004/0139391 A1* 7/2004 Stumbo et al. .............. 715/512
2005/0025333 A1  2/2005 Fujii

FOREIGN PATENT DOCUMENTS

| EP | 1304625 |   | 4/2003 |
| JP | 11-175585 | * | 7/1999 |
| JP | 2000/181868 |   | 6/2000 |
| JP | 2000-181868 | * | 6/2000 |
| JP | 2002-352217 |   | 12/2002 |
| JP | 2002/352217 |   | 12/2002 |
| JP | 2004-289783 |   | 10/2004 |

OTHER PUBLICATIONS

Extended European Search Report, EP 05255224, dated Jul. 8, 2008.

* cited by examiner

*Primary Examiner*—Mark K Zimmerman
*Assistant Examiner*—Haris Sabah
(74) *Attorney, Agent, or Firm*—Antonelli, Terry, Stout & Kraus, LLP.

(57) ABSTRACT

The object of the present invention is to provide a document processing apparatus capable of extracting written-in notes on a paper document and printing a document only of written-in notes or a document with a part of written-in notes by a writer left behind, and setting a limit on printing on each written-in note. The above object is achieved by apparatus for processing a document by providing a paper document to print with information for identifying an electronic document as the origin of printing, comprising: written-in notes extracting means for extracting a difference (written-in notes) between the paper document and an electronic document and storing written-notes as image information; text conversion means for converting extracted written-in notes into text as character information, and storing the text; and means for generating a print document by laying out image information of written-in notes and written-in information in text form.

11 Claims, 19 Drawing Sheets

FIG. 2

| DOC ID | DOC VERSION | STORAGE DIRECTORY |
|---|---|---|
| A01 | 1 | C:¥FOLDER 1¥A01 |
| B01 | 2 | D:¥FOLDER 2¥B01 |
| C01 | 3 | E:¥FOLDER 3¥C01 |

FIG. 3

| DOC ID | DOC VERSION | WRITE-IN No. | WRITTEN-IN CONTENT (TEXT) | IMAGE STORAGE AREA | POS INFO (START) | | POS INFO (END) | |
|---|---|---|---|---|---|---|---|---|
| | | | | | $X_1$ | $Y_1$ | $X_2$ | $Y_2$ |
| A01 | 1 | 1 | "A" WAS ADOPTED AS FINAL DECISION | A:¥IMAGE¥A01-1 | 100 | 100 | 160 | 110 |
| A01 | 1 | 2 | STUDY OF ×× REQUESTED BEF NEXT MTG | A:¥IMAGE¥A01-2 | 50 | 150 | 110 | 160 |
| A01 | 1 | 3 | NEXT MEETING WILL BE HELD ONE WEEK LATER | A:¥IMAGE¥A01-3 | 50 | 170 | 110 | 170 |

WHEN "HANDWRITTEN" IS SELECTED    WHEN "TEXT" IS SELECTED

FIG. 12

| | |
|---|---|
| THEME FOR TODAY<br>1. CONSIDERATION OF CANDIDATES FOR FINAL DECISION<br>  A FINAL DECISION IS MADE TO SELECT AMONG:<br>   CANDIDATE A: _____.<br>   CANDIDATE B: _____.<br>   CANDIDATE C: _____.<br>   *"A" was adopted as the final decision*<br><br>2. DECISION ON DATE FOR NEXT MEETING<br>  *the members are requested to consider XX before the next meeting*<br><br>  *the next meeting will be held one week later.* | THEME FOR TODAY<br>1. CONSIDERATION OF CANDIDATES FOR FINAL DECISION<br>  A FINAL DECISION IS MADE TO SELECT AMONG:<br>   CANDIDATE A: _____.<br>   CANDIDATE B: _____.<br>   CANDIDATE C: _____.<br>   "A" WAS ADOPTED AS THE FINAL DECISION<br><br>2. DECISION ON DATE FOR NEXT MEETING<br>  THE MEMBERS ARE REQUESTED TO CONSIDER XX BEFORE THE NEXT MEETING<br><br>  THE NEXT MEETING WILL BE HELD ONE WEEK LATER. |
| WHEN "HANDWRITTEN" IS SELECTED | WHEN "TEXT" IS SELECTED |

FIG. 13

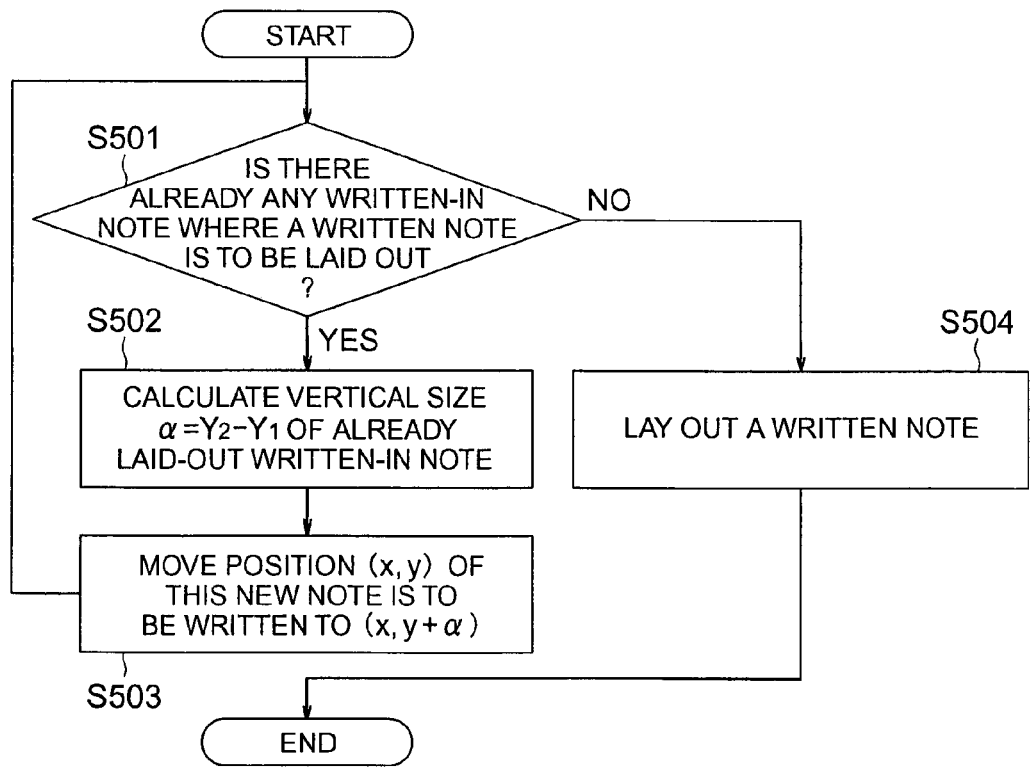

FIG. 15

| DOC ID | DOC VERSION | WRITE-IN No. | WRITTEN-IN CONTENT (TEXT) | IMAGE STORAGE AREA | POSITION INFO (START POINT) | | POSITION INFO (END POINT) | | WRITE-IN CLASSIFI-CATION |
|---|---|---|---|---|---|---|---|---|---|
| | | | | | $X_1$ | $Y_1$ | $X_2$ | $Y_2$ | |
| B01 | 2 | 1 | "B" WAS ADOPTED AS FINAL DECISION | B:¥IMAGE¥B01-1 | 100 | 100 | 160 | 110 | WRITER A |
| B01 | 2 | 2 | STUDY OF ○○ REQUESTED BEF. NEXT MTG | B:¥IMAGE¥B01-2 | 50 | 150 | 110 | 160 | WRITER B |
| B01 | 2 | 3 | NEXT MEETING WILL BE HELD TWO WEEKS LATER | B:¥IMAGE¥B01-3 | 50 | 170 | 110 | 170 | WRITER C |

FIG. 17

SELECT WRITTEN-IN NOTES TO PRINT
  (1) WRITER AS OBJECT OF PRINTING
      ☑ WRITER A
      ☐ WRITER B
      ☑ WRITER C (2) PRINT-FORM OF WRITTEN NOTES
      ● TEXT
      ○ HANDWRITTEN

FIG. 21

| DOC ID | DOC VERSION | WRITE-IN No. | WRITTEN-IN CONTENT (TEXT) | IMAGE STORAGE AREA | POSITION INFO (START) | | POSITION INFO (END) | | ACCESS RIGHT | ACCESS LIMIT START DATE | ACCESS LIMIT END DATE |
|---|---|---|---|---|---|---|---|---|---|---|---|
| | | | | | $X_1$ | $Y_1$ | $X_2$ | $Y_2$ | | | |
| C01 | 3 | 1 | C WAS ADOPTED AS FINAL DECISION | C:¥IMAGE¥C01-1 | 100 | 100 | 160 | 110 | DEPT MGR | 2004/5/3 | — |
| C01 | 3 | 2 | STUDY OF ○○ REQUESTED BEF NEXT MTG | C:¥IMAGE¥C01-2 | 50 | 150 | 110 | 160 | SECT CHF | 2004/6/18 | 2004/6/30 |
| C01 | 3 | 3 | NEXT MTG 3 WEEK LATER | C:¥IMAGE¥C01-3 | 50 | 170 | 110 | 170 | SUB-SECT CHF | 2004/7/30 | — |

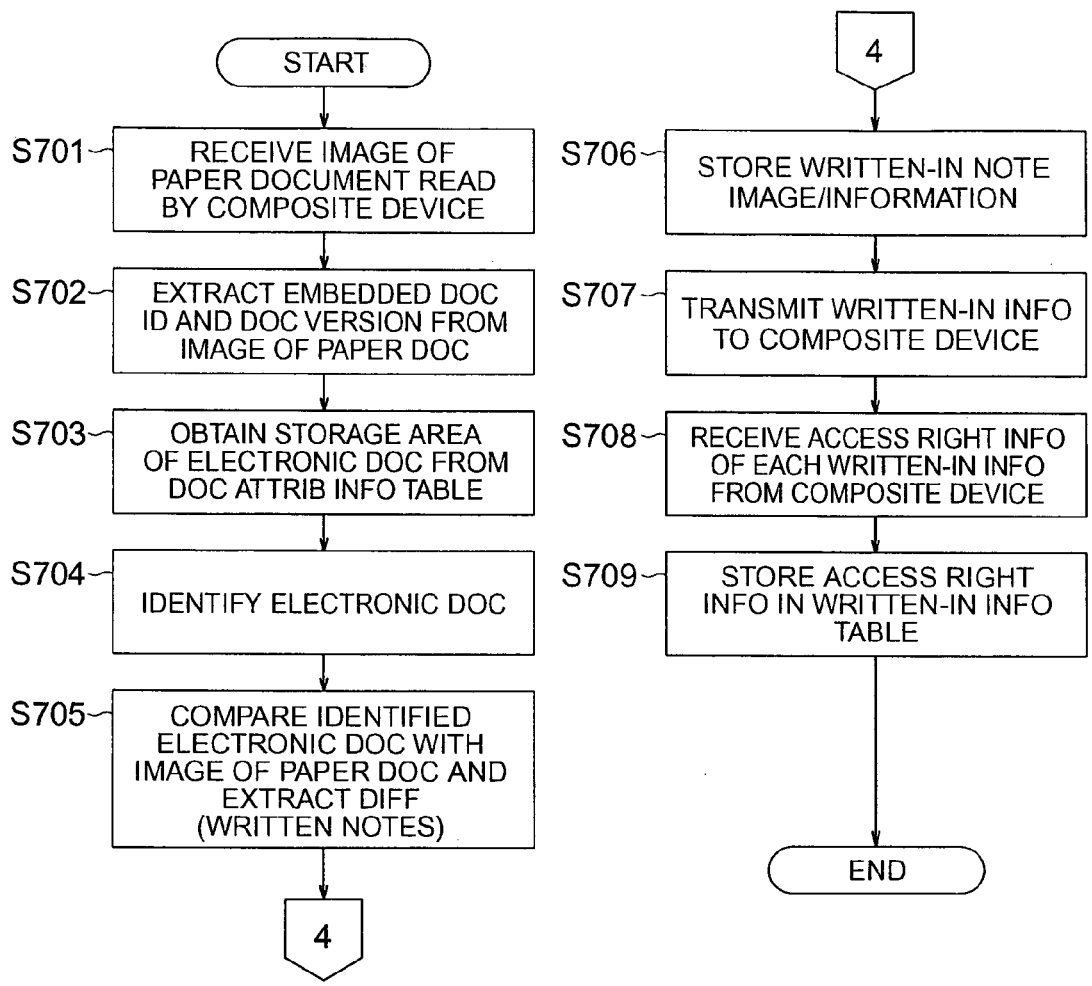

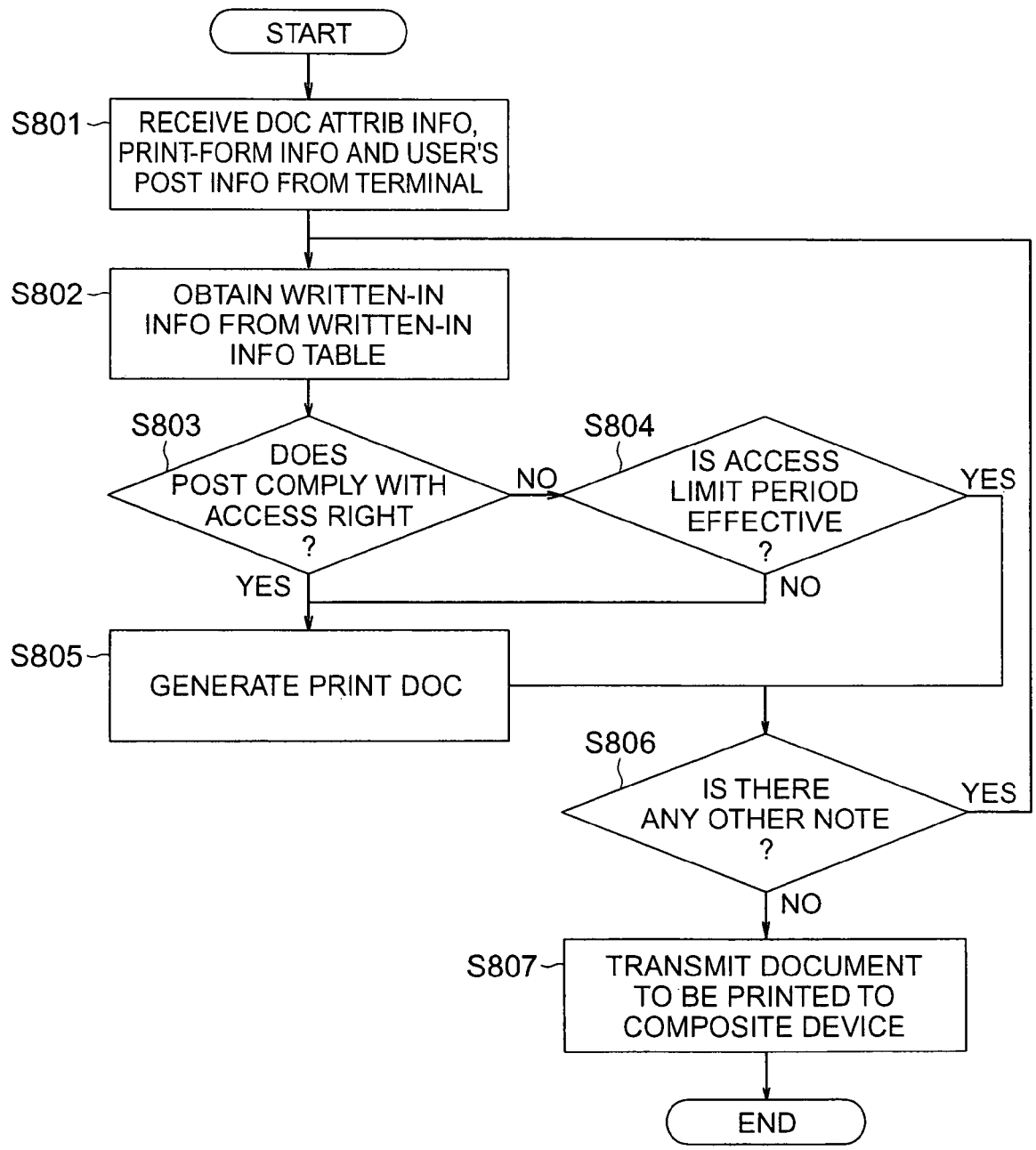

DOCUMENT PROCESSING APPARATUS AND METHOD

INCORPORATION BY REFERENCE

The present application claims priority from Japanese application JP2004-246093 filed on Aug. 26, 2004, the content of which is hereby incorporated by reference into this application.

BACKGROUND OF THE INVENTION

1. Field of the Invention

The present invention relates to a document processing apparatus, and more specifically to a document processing apparatus which has a print document carry information to identify an electronic document when printing out an electronic document stored in the document managing system, and makes it possible to print only information the user requires out of all information written on the paper document.

2. Description of the Related Art

At present, generally, a large number of documents are made electronically and printed on paper when they are used. Printed paper documents are used as distribution documents, and additional notes are often written directly with a pen or the like. If the user wants to have new information written on a paper document reflected in an electronic document in his management of documents, it is necessary to type the written-in information on the keyboard or the like, which is very troublesome.

To save the trouble, JP-A-2002-352217 discloses a document managing device adapted such that when printing a stored electronic document, by having a paper document carry information to identify that electronic document and by having the electronic document to be identified from the paper document, information written in on the paper document is automatically reflected in the electronic document.

SUMMARY OF THE INVENTION

However, in the above-mentioned document managing device, because additional written-in information which has been extracted is directly reflected in the electronic document, there is no way to discriminate between the original document portion and the additional written-in information portion. In other words, from a document in which written-in information has been reflected, it has been impossible to select out a document having only written-in information or the original document as the object of printing. Moreover, there is no way to print a document having only a part of written-in information left behind out of all written-in information on the paper document.

The present invention has as its object to provide a document processing apparatus, which can print by selecting a document carrying only written-in information on a paper document, only an original electronic document, or an electronic document in which written-in information have been reflected, and which can print a document having only a part of written-in information left behind by adding association information or access right information to the written-in information on a paper document.

In a first mode of achieving the above object, a document processing apparatus according to the present invention comprises information adding means for adding identification information for identifying an electronic document to a print document when printing an electronic document electronically stored in a storage device; document printing means for printing an electronic document added with information for identifying the electronic document; document reading means for reading the paper document having newly written-in information added thereto and generating image information; information extracting means for extracting identification information added to the electronic document from the image information and associating stored electronic document with the image information; written-in information extracting means for comparing an electronic document identified by the identification information extracted by the information extracting means with this image information, extracting written-in information newly added to the paper document, and storing each piece of written-in information as image data; text conversion means for converting text-convertible written-in information out of the extracted written-in information into text data and storing the text data; print document generating means for laying out on a print document the image data or the text data of the stored written-in information, and generating a print document of a new output type; and adjusting means for adjusting a layout position of the written-in information, which is to be laid out on the print document if written-in information lie one upon another on the print document when generating the print document.

The document processing apparatus further includes means for selecting and outputting only the extracted written-in information or only an original electronic document, or an electronic document in which the written-in information has been reflected; and means for displaying an screen image for selecting an output portion.

The document processing apparatus, to output the written-in information portion when outputting only the extracted written-in information or both the extracted written-in information portion and the electronic document, comprises means for selecting and outputting image data of the written-in information or text as character information converted from the written-in information; and means for displaying a screen image for selecting a kind to output.

In a second mode of achieving the above object, a document processing apparatus according to the present invention comprises information adding means for adding identification information to an electronic document to identify this electronic document when printing an electronic document electronically stored in a storage device; document printing means for printing an electronic document added with the identification information; document reading means for reading this paper document added with newly written-in information and generating image information; information extracting means for extracting identification information added to the electronic document from the image information, and associating the image information with stored electronic document; written-in information extracting means for, with regard to the image information of the read-in paper document, comparing an electronic document identified by the identification information extracted by the information extracting means with the image information, extracting written-in information newly added to the paper document, and storing each piece of written-in information as image data of each of the written-in information; text conversion means for converting text-convertible written-in information into text data and storing the text information; print document generating means for laying out on a print document image data or the text data of the stored written-in information, and generating a print document of a new output type; and means for classifying the extracted written-in information by writers who wrote in, adding association information of each writer, who wrote in, to the extracted written-in information, and storing the written-in information.

The document processing apparatus further includes means for selecting a specific writer who wrote in or a plurality of writers who wrote in from written-in information associated with each writer who wrote in and stored and outputting the writer or writers, and means for displaying a screen image for selecting the writer or writers as an object of output, and means for adjusting a layout position of written-in information if the extracted written-in information lie one upon another on a print document when generating the print document.

In a third mode of achieving the above object, a document processing apparatus according to the present invention comprises information adding means for adding identification information to identify an electronic document when printing the electronic document electronically stored in a storage medium; document printing means for printing an electronic document added with identification information; document reading means for reading a printed paper document having newly written-in information added thereto and generating image information; information extracting means for extracting identification information added to the electronic document from the image information, and associating the image information with stored electronic document; written-in information extracting means for comparing an electronic document identified by the identification information extracted by the information extracting means with the image information, extracting written-in information newly added to the paper document, and storing each piece of written-in information as image data; text conversion means for converting text-convertible written-in information out of the extracted written-in information into text data, and storing the text data; print document generating means for laying out on a print document the image data or the text data of the stored written-in information on a print document and generating a print document of a new output type; means for setting an access right for each of the extracted written-in information in the written-in information extracting means, and storing the extracted written-in information; and means for displaying a screen image for setting an access right for each of the written-in information.

In the document processing apparatus, the print document generating means further includes means for comparing an access right of a writer making a request to output a document with an access right set for each of written-in information, laying out only a permissible written-in information on a print document, and generating a print document; means for laying out written-in information in different colors allocated to access rights; and means for adjusting the layout position of written-in information if the extracted written-in information lie one upon another on a print document when generating the print document.

According to the present invention, by supplying a paper document with information to identify an electronic document when printing out an electronic document, it becomes possible to print by selecting a document carrying only information written in on a paper document, a document of the original, or a document made with written-in information reflected in an electronic document, and by adding association information about the writer who wrote in some information on a paper document or access right information, it is possible to print a document having only a part of written-in information left behind.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing an example of a document attributes information table 209 in the document managing system;

FIG. 3 is a diagram showing an example of a written-in information table 211 in the document managing system;

FIG. 12 is a diagram showing an output image when the document selection information is a "document in which written-in note has been reflected" in the sample image in FIG. 9;

FIG. 13 is a flowchart of a process of laying out written-in notes in a print document;

FIG. 15 is a diagram showing an example of a written-in information table 512 in the document managing system;

FIG. 17 is a diagram showing a print item selection interface in the second embodiment;

FIG. 21 is a diagram showing an example of the written-in information table 812 in the document managing system;

FIG. 22 is a flowchart of a process of setting an access right, an access limit starting date, and an access limit ending date for each note written in on a paper document;

FIG. 23 is a diagram showing an access right setting interface in the third embodiment;

FIG. 24 is a flowchart of a process of printing a document based on the access right set to each written-in information in response to a request to print a written-in information document, and printing a document conforming to the right of the user;

DETAILED DESCRIPTION OF THE EMBODIMENTS

Preferred embodiments of the present invention will be described with reference to the accompanying drawings.

Embodiment 1

As a first embodiment of the present invention, description will be made of a document processing apparatus for extracting written-in information by comparing a previously stored electronic document and a paper document in which some note has been written and for, by using this written-in information, printing only a written-in information or the original document or a document in which written-in information has been reflected.

Figure 1:
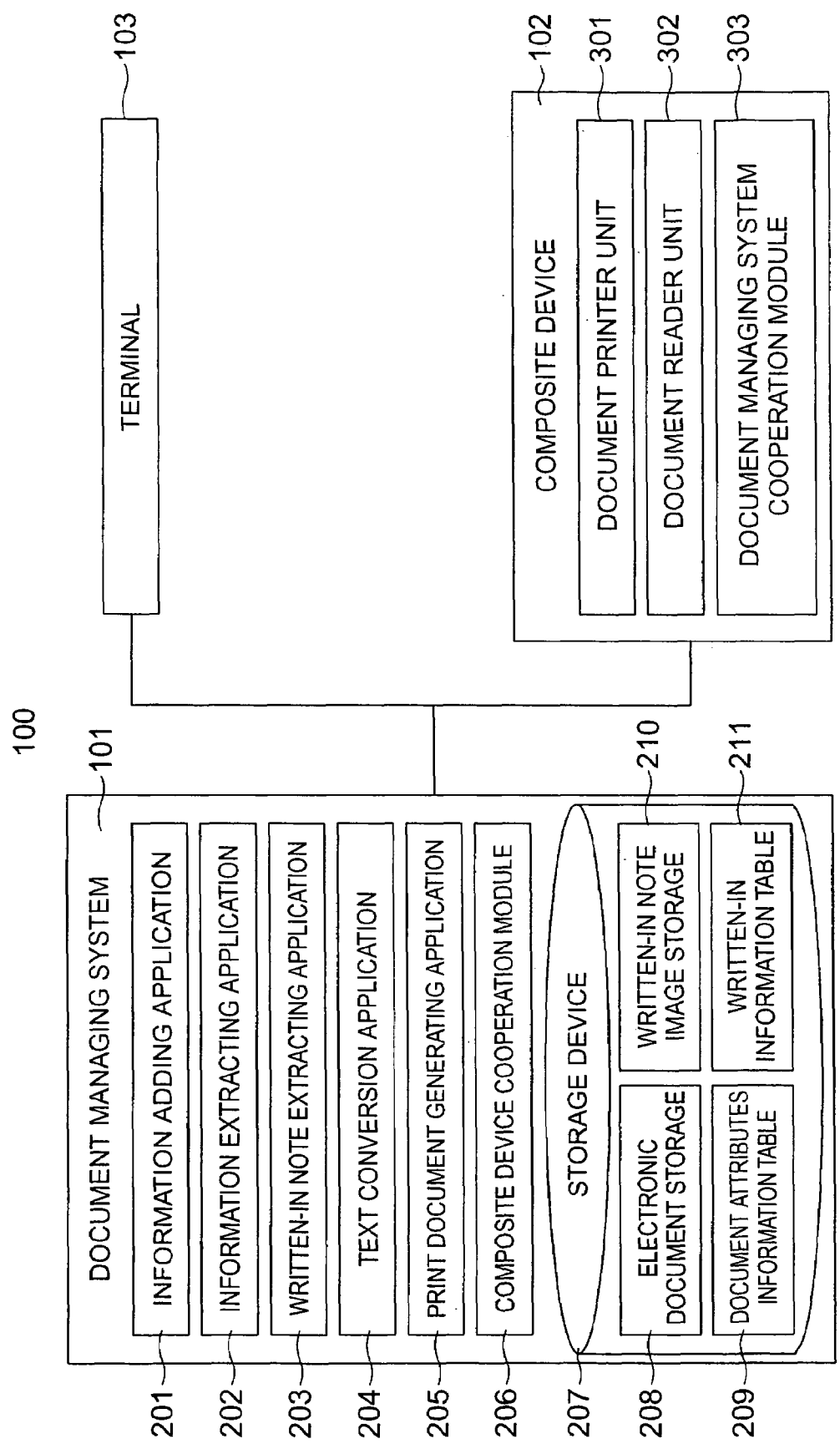
FIG. 1 is a block diagram showing a functional composition of a document processing apparatus 100 in a first embodiment of the present invention.

FIG. 1 is a block diagram showing a functional composition of a document processing apparatus 100 according to a first embodiment of the present invention. The document processing apparatus 100 includes a document managing system 101, a composite device 102, and a terminal 103. Those units can transmit data between them over a network(s). As for configuration of those units, a plurality of units may be combined to form a single set of equipment or may be configured as separate sets of equipment. In whatever form they may be configured, they need to be able to transmit data to one another across a network(s).

The terminal may be a computer the user uses, the document managing system may be a server for processing requests received from the terminal and commands issued to the composite device. The composite device may be a device including the functions of a copy machine, a printer and a computer, or a composite device of any other kind. The network has only to be capable of data communication or the like, whether it is wired or wireless.

The document managing system 101 includes an information adding application 201, an information extracting application 202, a written-in note extracting application 203, a text conversion application 204, a print document generating application 205, a composite device cooperation module 206, an electronic document storage 208 in a storage device 207, a document attributes information table 209, a written-in note image storage 210, and a written-in information table 211. Here in the devices of this embodiment, the applications denote programs that run on the computer and the module denotes a program that needs communication across a network(s). Note that those applications and the module are shown as examples and software other than those applications may be used.

Their functions are described as follows. The information adding application 201 adds a bar code representing a document ID and a document version information to a document as an object of printing or embeds the ID and the version in the form of watermark information. The information extracting application 202 extracts the document ID and the document version information from image information generated by having the document reader unit read a paper document added with the bar code or watermark information.

To embed watermark information, it is possible to use a large variety of technology, which are known or will be developed in the future. It is also possible to use binary image electric watermark technology which provides ID peculiar to binary images, such as documents, tables, maps, and so on. For example, U.S. patent application Ser. No. 10/841,842 (Japanese Patent Application No. 2003-343917 (Japanese Patent Application Laid-Open No. 2004-289783)) by the assignee of this patent application discloses a technology based on human visual characteristics, which by preferentially selecting a place where alterations are inconspicuous, and out of digital data of binary images, such as documents, tables, or maps, and by inverting pixel values at this place to embed a large amount of information while maintaining picture quality. The binary image electronic watermark technology can be installed by software, and existing printers and scanners can be utilized.

The written-in note extracting application 203 compares an electronic document, identified based on a document ID and a document version extracted from image information, with the image information, and extracts the written-in notes from the image information, and cuts out each written-in note and stores them as image data, and also stores the written-in information. However, when the document reader unit 302 of the composite device has read paper documents of the same ID as image information at a time, the written-in note extracting application 203 extracts written-in notes from the image information on the assumption that written-in notes existing in the image information were written in one paper document.

The text conversion application 204 converts extracted written-in information into text as character information and stores the text. The print document generating application 205 arranges stored written-in information (image data or text) on a print document and generates a new print document. The composite device cooperation module 206 exchanges information with the composite device. The electronic document storage 208 is an area where generated and edited electronic documents are stored.

The document attributes information table 209 is an area where storage areas of electronic documents stored in the electronic document storage 208 are saved associated with document IDs and document versions. (FIG. 2 is an example of the document attributes information table. Shown as an example in FIG. 2 is information in which the document IDs, document versions and storage directories are associated.)

The written-in note image storage 210 is an area where, out of extracted written-in information, image data of cutouts of written-in notes are stored. The written-in information table 211 is an area where, with regard to extracted written-in information, written-in contents, storage areas of written-in note image data, and written-in positions are stored. (FIG. 3 is an example of the written-in note image storage. Shown as an example in FIG. 3 is information about document IDs, document versions, write-in Nos., written-in contents, and image storage areas, and information about association of start points and end points in write-in coordinates on paper).

The composite device 102 includes a document printer unit 301, a document reader unit 302, and a document managing system cooperation module 303. Their functions are described as follows. The document printer unit 301 prints a print document on a paper document in response to a print order received from the document managing system. The document reading device 302 scans the paper document (reads letters or figures written on the paper), and generates image information. The document managing system cooperation module 303 transmits and receives information to and from the document managing system.

The terminal 103 is used to generate an electronic document or edit a stored electronic document in the document managing system. The terminal 103 is also used to transmit a request to print an electronic document to the document managing system.

Description will now be made of the flow of the process in the first embodiment in the document processing apparatus de-scribed above.

Figure 4:
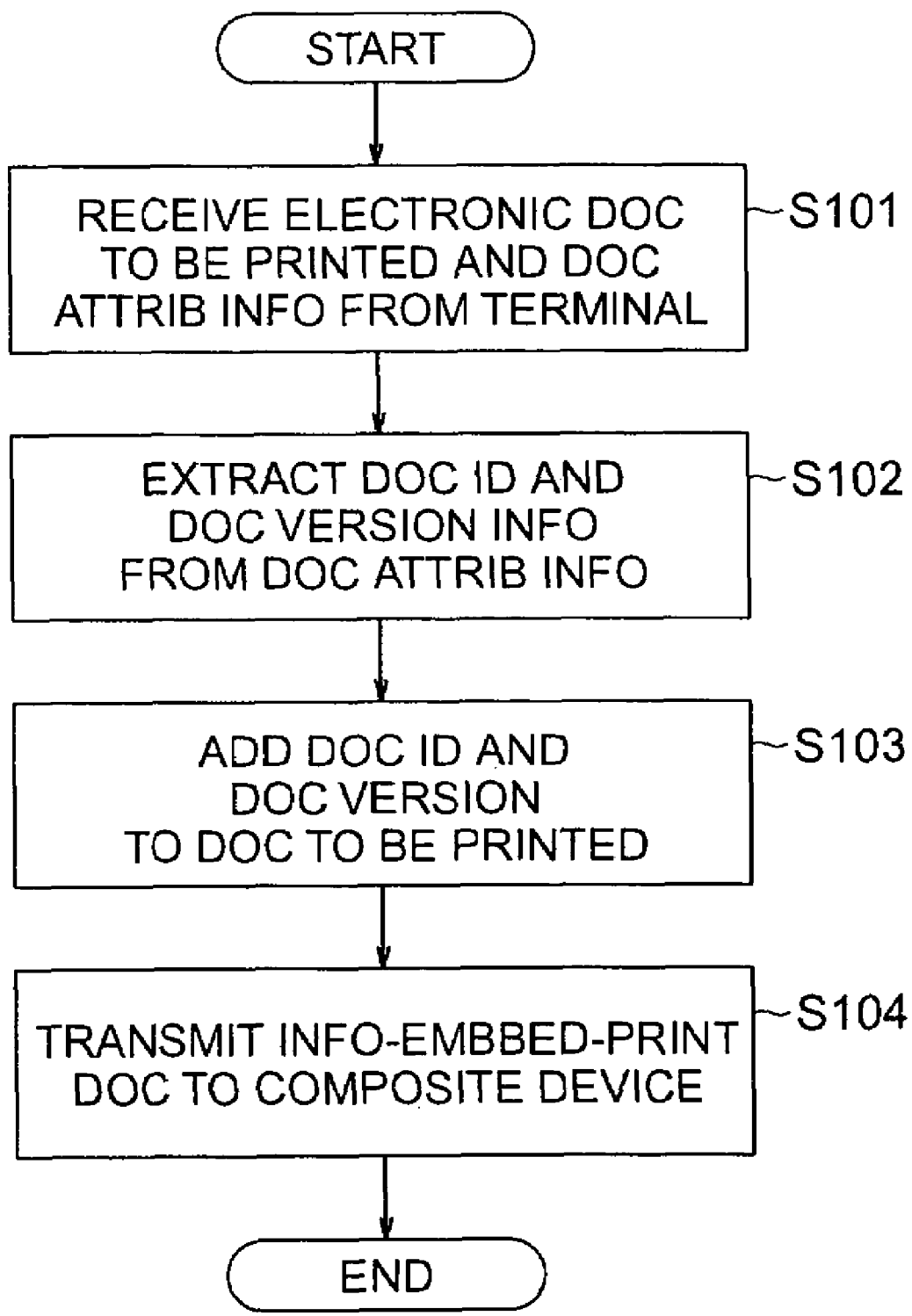
FIG. 4 is a flowchart for explaining a process for adding a document ID and document version information to an electronic document stored in the document managing system, and printing a paper document.

FIG. 4 is a flowchart of a process of adding a document ID and document version information to an electronic document stored in the document managing system and printing a paper document.

To describe the flowchart, on receiving a request to print an electronic document from the terminal, the document managing system obtains an electronic document as an object of printing and document attributes information about the electronic document (a document ID, document version information, a storage area, for example)(S101).

After obtaining an electronic document as an object of printing and document attributes information about the electronic document, the information adding application 201 in the document managing system extracts a document ID and document version information from the document attributes information, converts the above two items of information into bar code or watermark information, and add the bar code or embed the watermark to a document to be printed (S102, S103). The print document added with the two items of information in Step S104 is sent through the composite device cooperation module to the composite device which prints a paper document.

By a series of the above processes, a paper document added with information identifying an electronic document in the document managing system can be printed, and by having the paper document read by the document reader unit, the paper document can be associated with the electronic document. With regard to information added to a paper document, two items of information, that is, a document ID and document version information are added in this embodiment, but any information will do so long as the information is of a kind which can identify an electronic document from a paper document. If information is used which is different from those adopted in this embodiment, it is necessary to define a document information table to suit items of information used.

Description will be made of a process of printing by selecting a document carrying only written-in notes, which were added in on a printed paper document or a document of the original or a document in which written-in notes have been reflected. To show an output image generated by a series of processes, a sample of a paper document, which is to be read in, is presented in FIG. 9.

Figure 5:
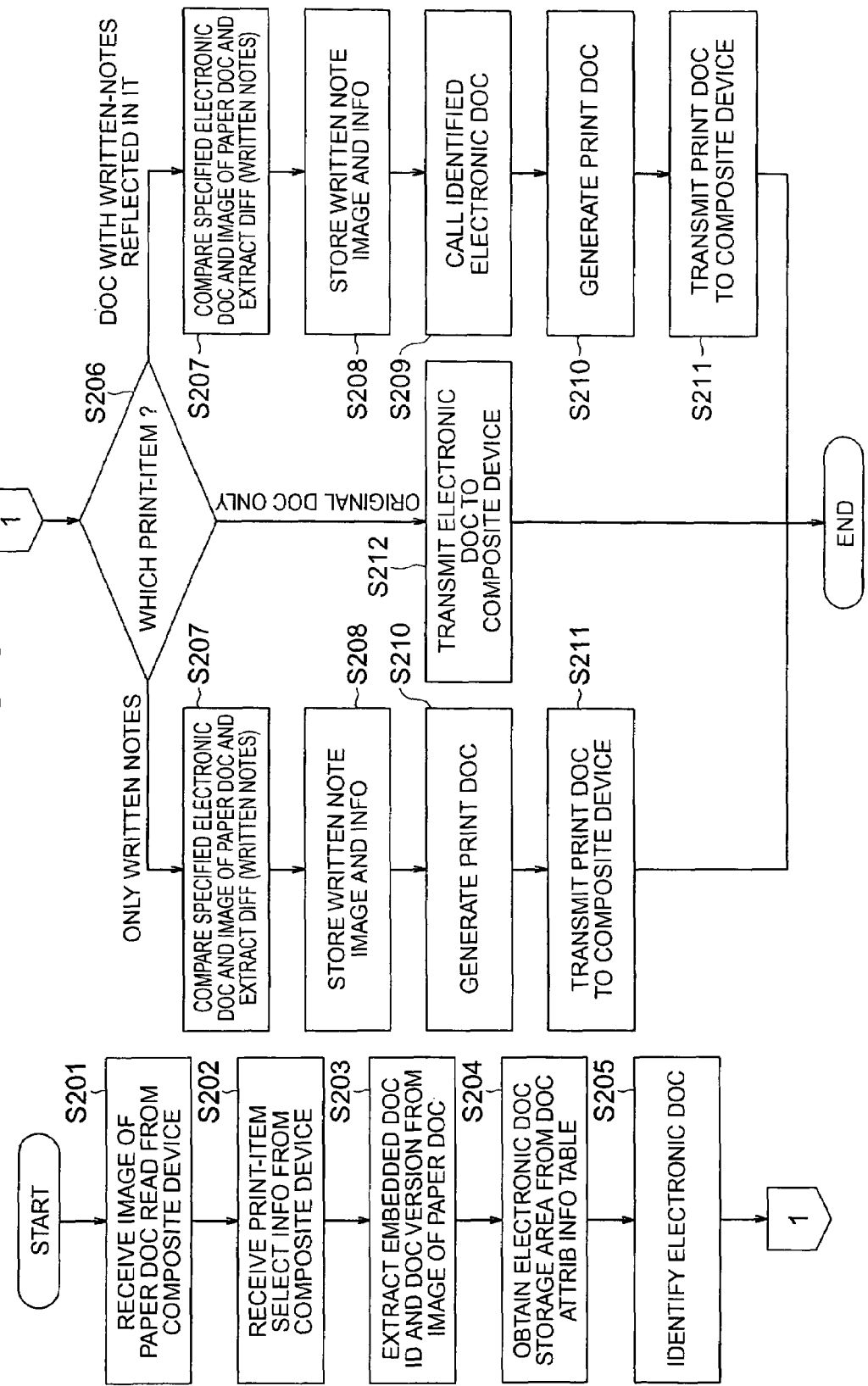
FIG. 5 is a flowchart of a process of extracting written-in information added to a printed paper document, and selecting only written-in information or the original document or a document in which written-in note has been reflected and printing a selected one.

FIG. 5 is a flowchart of a process of printing by selecting a document carrying only written-in notes, which were added in on a printed paper document, or the original document or a document in which written-in notes have been reflected.

Figure 6:
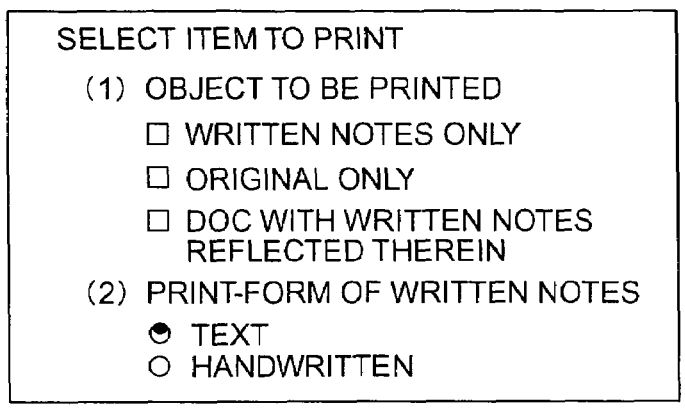
FIG. 6 is a diagram showing a print item selection interface in the first embodiment.

To describe the flowchart, the document managing system 101 receives from the composite device 102 image information generated by having the document reader unit read a paper document in which some note was written by hand (S201). Simultaneously with S201, the document managing system also receives, from the composite device, print item selection information obtained based on the user interface screen shown in FIG. 6 on the composite device (S202). Here, the print-item selection information includes selection information about a document to be printed (a "document only of written-in notes", an "original document", a "document in which written-in notes have been reflected"). For a document only of written-in notes and a document having written notes reflected in it, the print-item selecting information also includes print-form selection information to select "Handwritten" for printing written-in information on a paper document or "Text" for printing a character string in text in addition to the document selection information. In S203, S204 and S205, the information extracting application 202 in the document managing system extracts a document ID and a document version from image information of a paper document received from the composite device, obtains a storage area of a corresponding electronic document from the document attributes information table 209 by using the two items of information, and identifies the electronic document.

After the electronic document in the document managing system has been identified, by document selection information of the print-item selection information received from the composite device 102 together with image information, the flow diverges to different generating and printing processes of print document (S206).

Description will be made of a case where the document selection information is "only written-in notes". The written-in note extracting application 203 in the document managing system compares the image information on paper document with a identified electronic document, and extracts written-in information (S207). For extracted written-in information, a storage process of written-in note image and information is carried out in S208. Then, based on stored written-in note image and information, the written-in information is arranged on a print document, and a print document is generated (S210). By transmitting a generated print document to the composite device and printing a print document, a document of written-in note can be output (S211). Detailed contents of a storage process of the written-in note image and information (S208) and a process of generating a print document (S210) will be described later. FIG. 10 is an output image when the document selection information is "only written-in notes" as opposed to a sample document in FIG. 9.

When the document selection information is "the original document", an electronic document identified in S205 is sent to the composite device to print it (S212).

Figure 9:
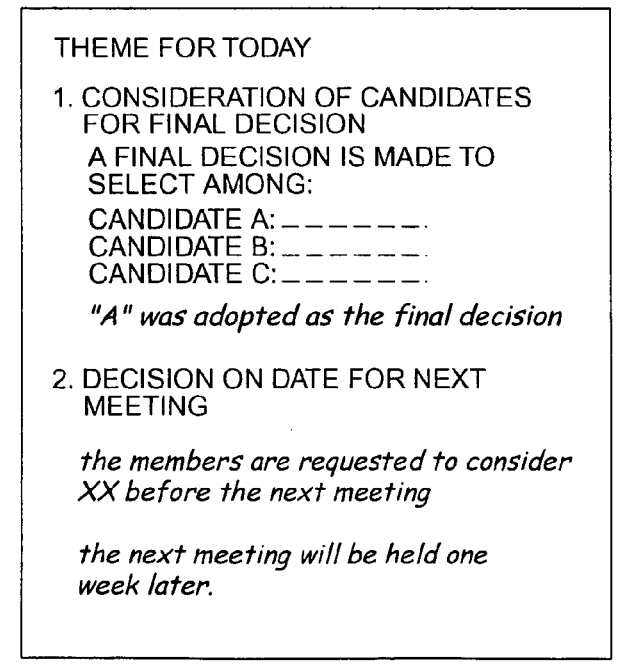
FIG. 9 is a diagram showing a sample of a paper document in which some note was written.
Figure 10:
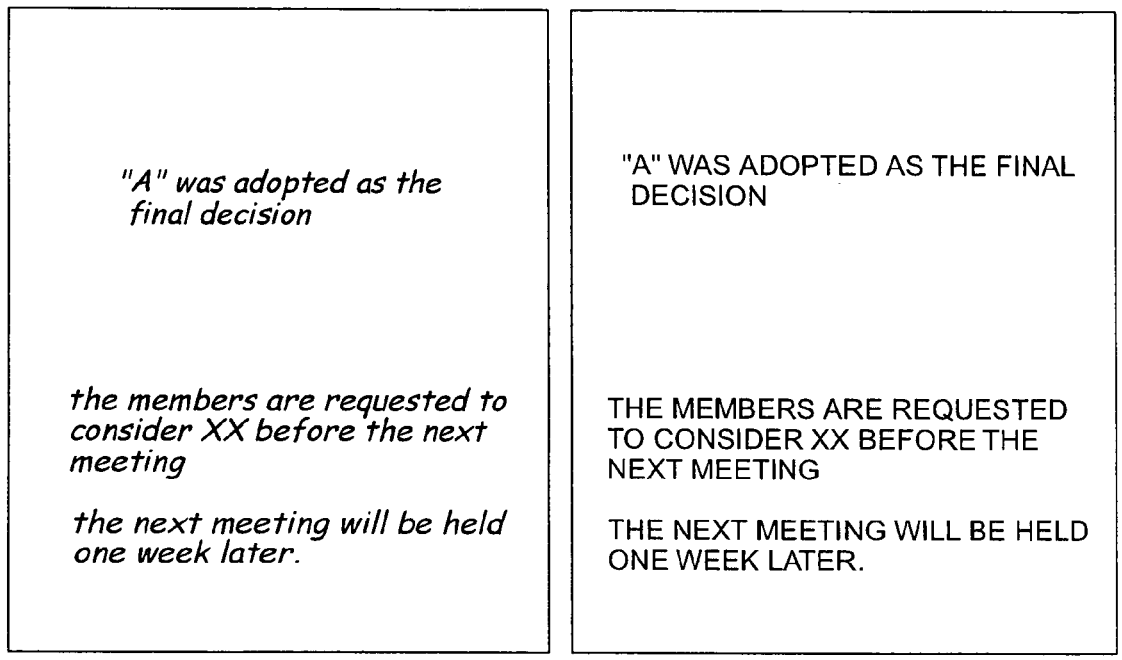
FIG. 10 is a diagram showing an output image when document selection information is "only written-in note" in the sample document in FIG. 9.
Figure 11:
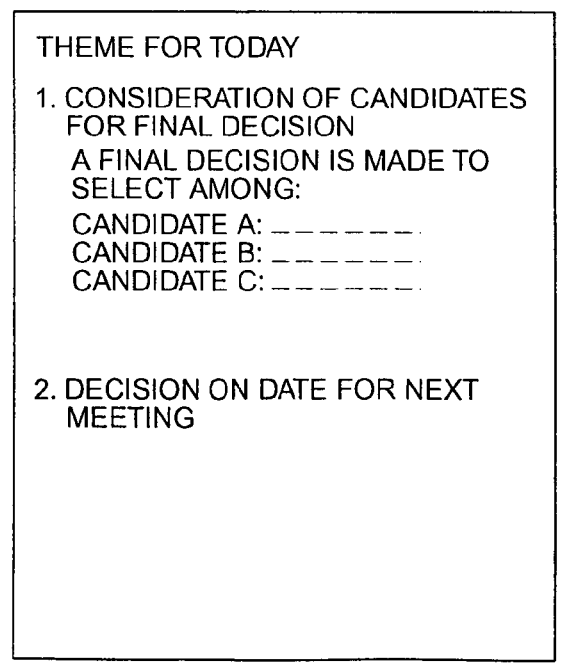
FIG. 11 is a diagram showing an output image when the document selection information is a "document of the original" in the sample document in FIG. 9.

As opposed to a sample document in FIG. 9, the output image when the document selection information is "the original document" is as shown in FIG. 11.

When the document selection information is a "document in which written-in notes have been reflected", as is the case with a "document of only written-in notes", in S207 and S028 the written-in note extracting application in the document managing system compares the image information on a paper document with a identified electronic document, extracts differences (written-in notes), and stores written-in note image and information with regard to the extracted written-in information. Then, a print document is to be generated, but in the case of a "document in which written-in notes have been reflected", because written-in notes need to be laid out on the original document, in S209 the original document is called. After the original document is called, by generating a print document (S210) and transmitting the generated print document to the composite device (S211), a document in which written-in notes have been reflected can be printed.

As opposed to the sample document in FIG. 9, an output image when the document selection information is a "document in which written-in notes have been reflected" is as shown in FIG. 12.

Description is now made of detailed contents of a process of storing the above-mentioned written-in note image and note (S208) and a process of generating a print document (S210).

Figure 7:
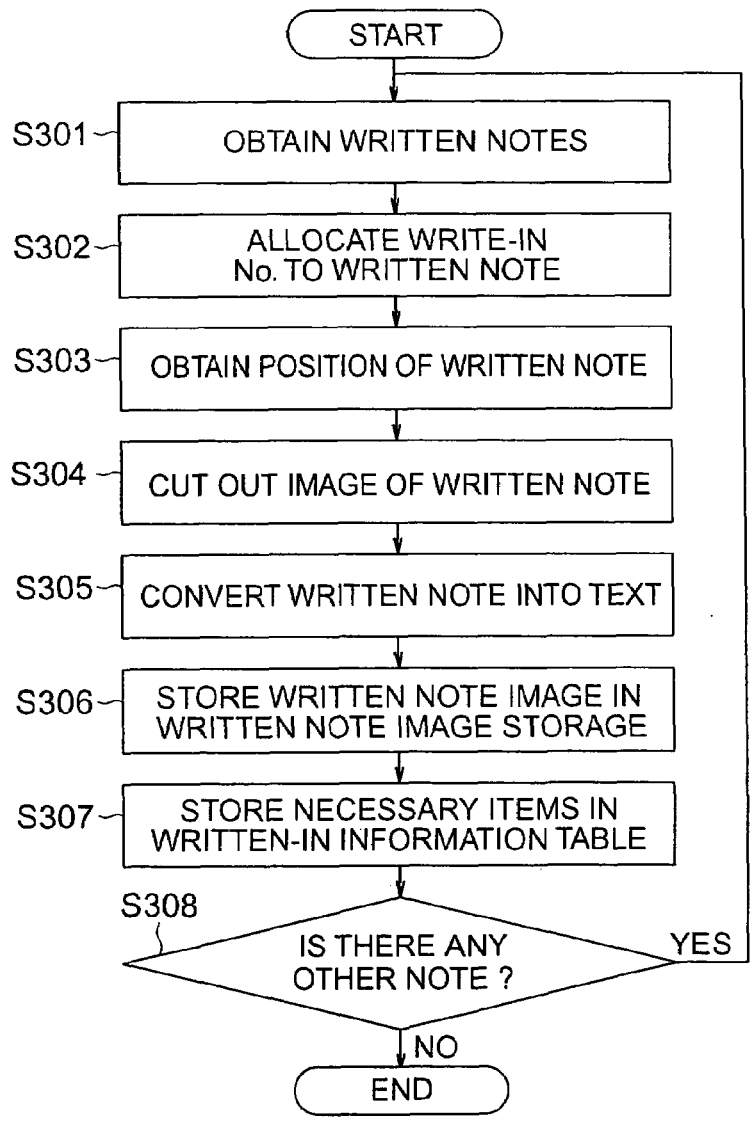
FIG. 7 is a flowchart of written-in note image and information storing process.

FIG. 7 is a flowchart showing a process of storing written-in note image and information.

In S207, by comparing the identified electronic document with the image information, written-in information is extracted succesively starting with the information at the upper left corner of the document, and the following processes are repeated (S308). The written-in note extracting application 203 in the document managing system obtains one piece of written-in information (S301), assigns a unique write-in No. in the relevant image information (S302). Then, the size of written-in note is obtained by means of two coordinates (start point, end point) (S303) and on the basis of the coordinates, image data of the written-in note is cut out from the image information (S304). The text conversion application 204 in the document managing system converts the characters in the image data of cut-out written-in note into text as character information (S305). The written-in note extracting application 203 stores a cut-out written-in note image in the written-in note image storage and the written-in note extracting application 203 and the text conversion application 204 respectively store information about written-in note in the written-in information table (S306, S307).

As opposed to a sample document in FIG. 9, written-in information stored in the written-in information table is as shown in FIG. 3. In the example of FIG. 9, three notes are written in on paper on which an electronic document was printed. On the basis of the example of FIG. 9, written-in information is managed by assigning a write-in No. to each of the three notes in the generated information table in FIG. 3. For example, a write-in No."1" is given to the note that "A was adopted as the final decision.", and when the handwritten characters of the written note are stored as image data in the storage device, the storage area (directory name) of the image is associated with coordinates information (start point, end point) indicating where the written note is located in the space of paper for management of information.

For the note that "the next meeting will be held one week later", a write-in No."2" is given, this note is stored in the storage device as an image file separate from the write-in No. 1 mentioned above, and the image file is associated with coordinates (start point, end point) indicating where this note of write-in No. 2 is located in the paper for management of information.

By individually managing written-in note images of extracted handwritten notes as describe above, it becomes possible to respond to address print commands or the like from users in an elaborate manner.

Figure 8:
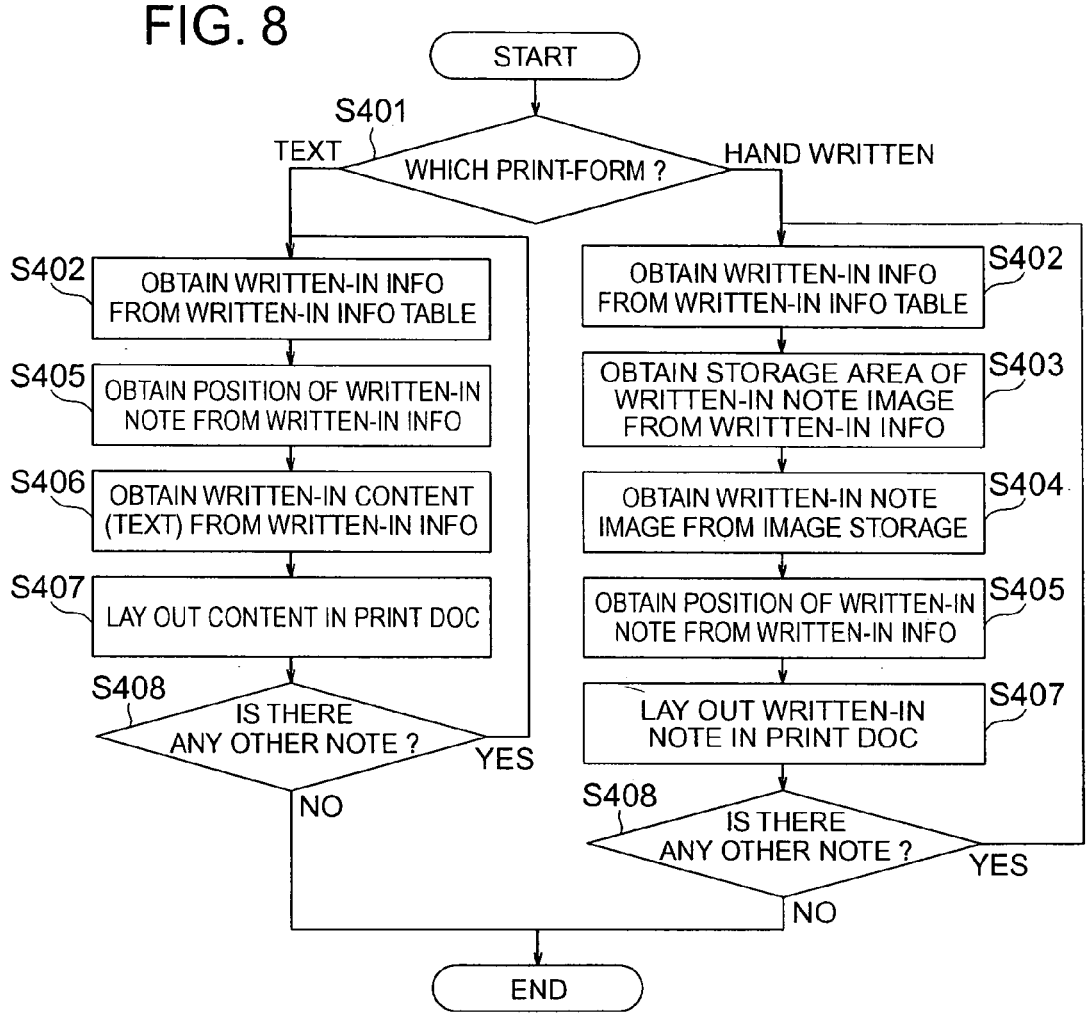
FIG. 8 is a flowchart of a print document generating process in the first embodiment.

FIG. 8 is a flowchart showing a process of generating a print document. When a print document is generated, the flow of the process differs with contents of the print-form selection information received from the composite device (S401).

When the print-form selection information is "Handwritten", the print document generating application 205, by using a document ID and a document version as the key, extracts the written-in information stored in the written-in information table in the storing process of written-in note image and information (S402), and performs a process on each piece of written-in information as described below (S408). The print document generating application 205 obtains written-in information storage area obtained from the written-in information table (S403), and obtains written-in note image data from the written-in note image storage (S404). Then, the application 205 obtains position information from the written-in information (S405), and lays out written-in note image data on a print document according to obtained position information (S407). At this time, a print document on which written-in notes are laid out is blank paper when the document selection information is a "document only of written-in notes", or a identified electronic document (original document) when the document selection information is a "document in which written-in notes have been reflected".

When the print-form selection information is "Text", just as in "Handwritten", the print document generating application 205, by using a document ID and a document version as the key, extracts written-in information stored in the written-in information table in the storing process of written-in note image and information (S402), and performs a process described below on each piece of written-in information (S408). The print document generating application 205 obtains position information and written-in contents (text) from obtained written-in information (S405, S406), and lays out obtained written-in contents (text) on a print document according to position information (S407). As in the case of "Handwritten", when the document selection information is a "document only of written-in notes", the print document used here is a blank file, and when the document selection information is a "document in which written-in notes have been reflected", the print document is a identified electronic document (original document), and in a relevant document, written-in information is laid out.

In the operation that "written-in contents are laid out on a print document" mentioned above, if a plurality of paper documents of the same ID are read at a time by the document reader unit 302 as image information, extracted written-in notes are treated as notes written on a single document, so that there is a possibility that written-in notes lie one upon another.

In S407, to prevent overlapping of written notes as in FIG. 13, a process of laying out written-in notes is carried out on a print document. This process is described in the following.

It is confirmed whether a laid-out written note exists in a position where a written note is to be placed on the basis of position information about a written note which is going to be placed (S501). Possible criteria for overlap which requires adjustment of layout positions are many, including a total overlap of written notes, a case where written notes overlap more than a certain area, a case where the start points overlap, and a case where the end points overlap, and so on. In this embodiment, but a decision is made whether a written note requires adjustment of its layout position by using the criteria mentioned above. If another written note has been placed previously, a vertical size a of the already laid-out written-in note is calculated (S502), the write-in position where a new note is to be placed is moved by an amount of $+\alpha$ in the Y-axis direction (S503). Note, however, that the position information about the written-in note on the written-in information table is not modified directly, but the write-in position should be moved when generating a relevant print document. When adjusting the layout position, exception handling needs to be provided lest a written-in note after the adjustment should run off the edge of a print document. After other written-in notes have been cleared from the planned layout position for write-in, a written-in note is laid out in S504. Though the adjusting direction of write-in position has been described as the Y-axis direction in this embodiment, any other methods may be employed so long as an overlap of written-in notes can be avoided.

By the above-described flowcharts, the processes in the first embodiment can be achieved.

Embodiment 2

As a second embodiment of the present invention, description will be made of a document processing apparatus which extracts written-in notes by comparing a stored electronic document with a paper document in which notes have been written in, classifying and associating the written-in information by writers, and printing a document having only selected and associated written-in notes left behind.

Figure 14:
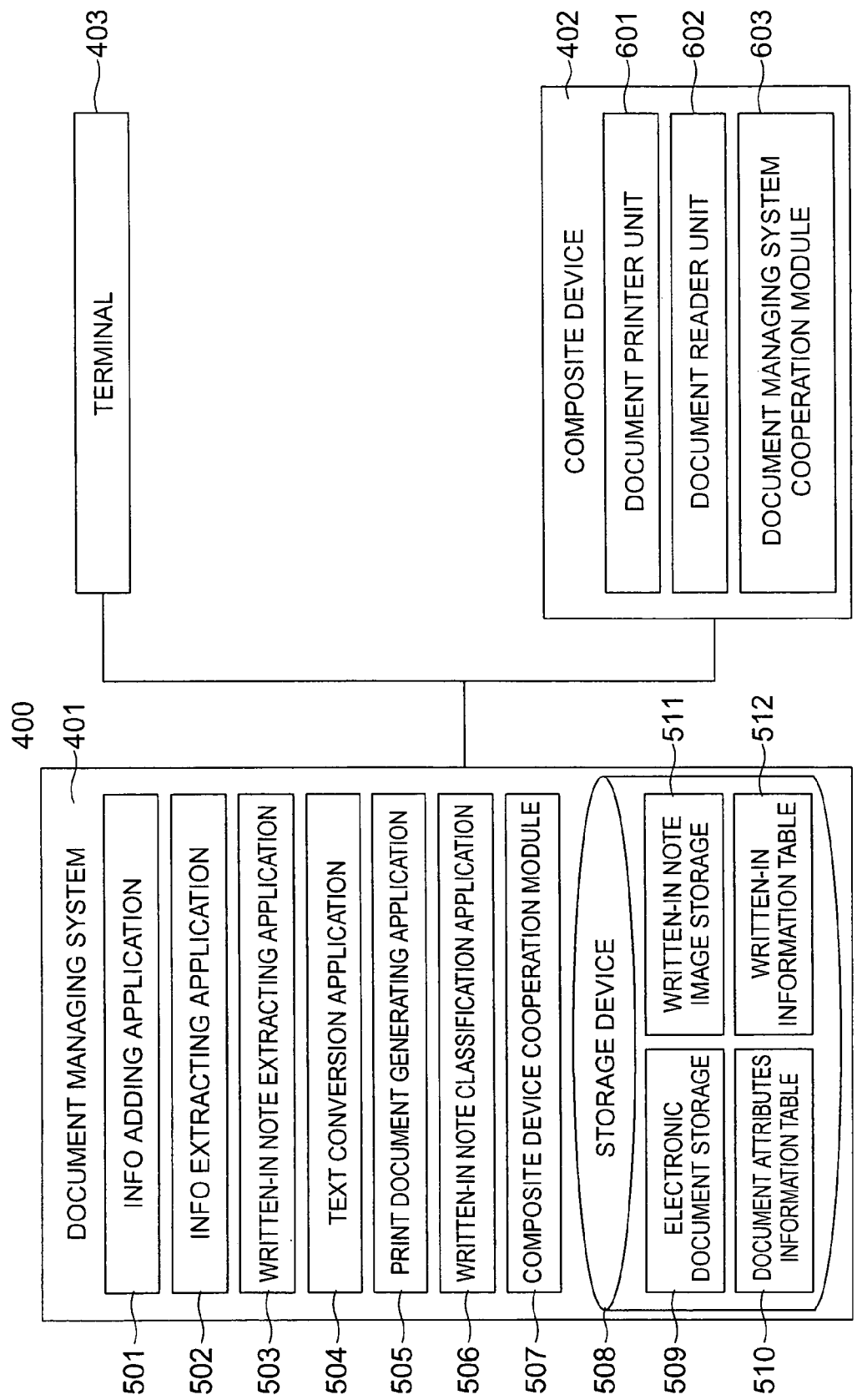
FIG. 14 is a block diagram showing a functional composition of a document processing apparatus 400 in a second embodiment of the present invention.

FIG. 14 is a block diagram showing a functional composition of a document processing apparatus 400 in the second embodiment. The document processing apparatus 400 includes a document managing system 401, a composite device 402, and a terminal 403. Those devices can communicate data with one another across a network(s). Moreover, with regard to configuration of those devices, a plurality of devices may be combined to form a set of equipment or may be configured into separate sets of equipment. However, in whatever form they may be configured, they must be able to communicate data with one another across a network(s).

The document managing system 401 includes an information adding application 501, an information extracting application 502, a written-in note extracting application 503, a text conversion application 504, a print document generating application 505, a written-in note classifying application 506, a composite device cooperation module 507, an electronic document storage 509 in the storage device 508, a document attributes information table 510, a written-in note image storage 511, and a written-in information table 512. As in the first embodiment, in the devices in this embodiment, the applications denote programs that run on the computer and the module denotes a program that needs communication across a network(s).

Among the various functions, those whose names were found in the first embodiment perform the same functions as those which were described in the first embodiment, namely, the information adding application 501, the information extracting application 502, the written-in note extracting application 503, the text conversion application 504, the print document generating application 505, the composite device cooperation application 507, the electronic document storage 509 in the storage device 508, the document attributes information table 510, the written-in note image storage 511, and the written-in information table 512, with one exception that the written-in information table 512 has one more column heading "Written-in note classification" (FIG. 15) than in the written-in information table 211 described in the first embodiment, and another exception that the document managing system 401 has a written-in note classifying application 506 added to those functions listed above. This classifying application 506 classifies extracted written-in information by colors of written-in notes.

The composite device 402 includes a document printer unit 601, a document reader unit 602, and a document managing system cooperation module 603. With regard to those units or their functions, those functions with the same names as in the first embodiment perform the same functions as in the first embodiment.

Similarly, the terminal 403 performs the same function as the terminal in the first embodiment.

Description will be made of a process in the second embodiment on the document processing apparatus describe above.

The process of adding a document ID and document version information to an electronic document stored in the document managing system and printing a paper document can be executed by the same process in FIG. 4 in the first embodiment.

Description will be made of a process of classifying the notes, written in on a paper document in different colors of the writers, according to colors of the written-in notes, associating written-in information with writers and storing the information, and printing a document having only written-in notes of a specific writer left behind. To show an output image generated by a series of processes, a sample of a paper document to be read is presented in FIG. 18.

Figure 16:
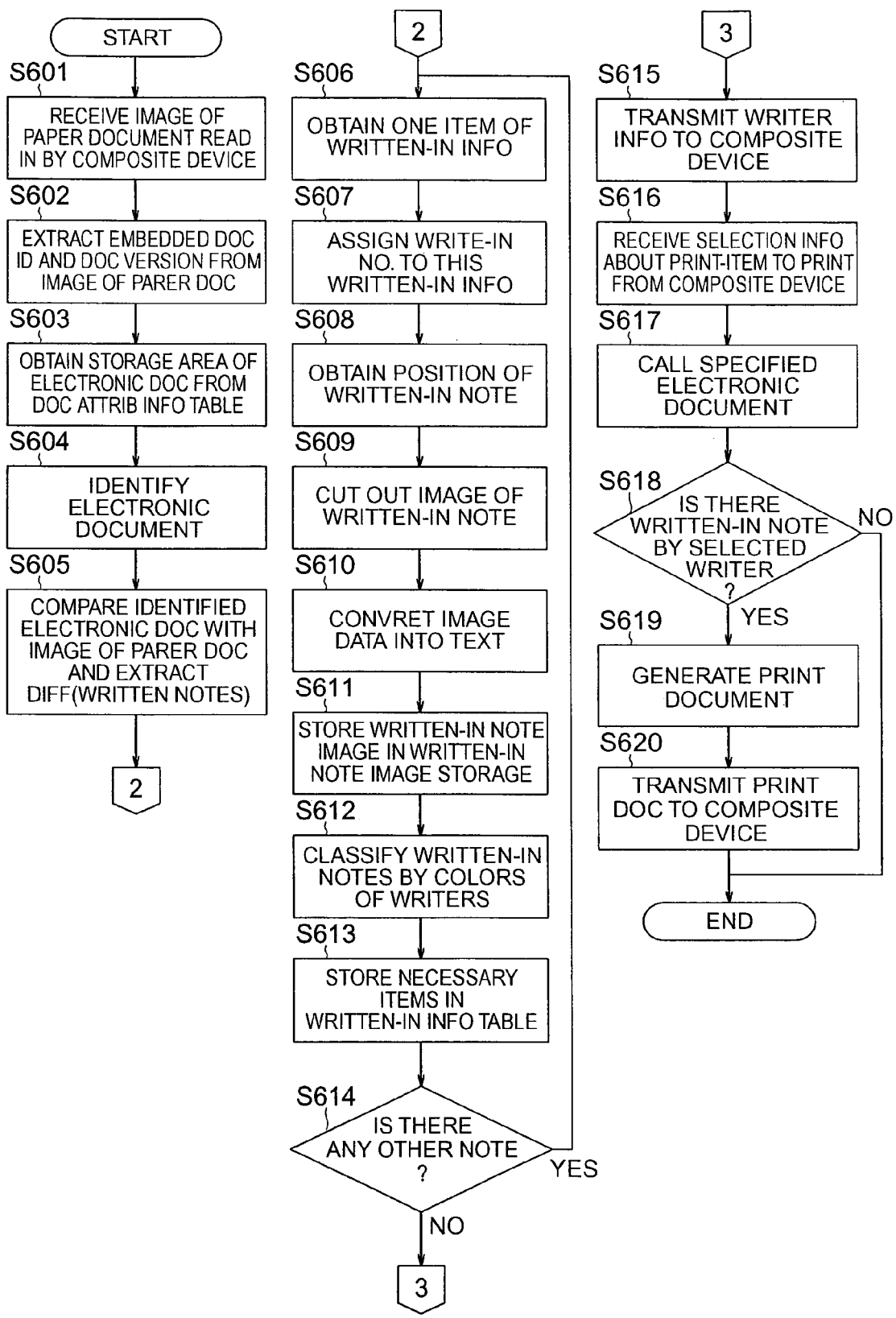
FIG. 16 is a flowchart of a process of classifying written-in notes on a paper document by colors of written-in notes, storing written-in notes after the written-in information has been associated with writers, and printing a document in which only a certain associated note is written.

FIG. 16 is a flowchart showing a process of classifying written-in notes, written in on a paper document in colors of different writers, according to colors of the written-in notes, associating written-in notes with the writers and storing the written-in notes, and printing a document having notes by a specific writer.

The description of the flowchart is as follows. In S601, image information is generated by having a paper document with notes written in different colors of the writers, for example, read by the document reader unit 602, and received from the composite device. In S602, S603 and S604, the information extracting application 502 in the document managing system extracts a document ID and a document version from image information on a paper document received from the composite device, obtains a storage area of the relevant electronic document from the document attributes information table by using the two items of information, and identifies the electronic document. Then, the written-in note extracting application 503 in the document managing system compares the image information on the paper document with the identified electronic document, and obtains written-in information (S605). By comparing the identified electronic document with the image information, the note extracting application 503 obtains the written-in information one after another starting with the information at the upper left corner of the document, and the following processes are repeated (S614). The written-in note extracting application 503 in the document managing system obtains information of one written-in note (S606), and assigns a unique write-in No. in this image information (S607).

Then, the size of the written-in note is obtained by using two coordinates (start point, end point) (S608), and on the basis of the coordinates, image data of the written-in portion is cut out from the image information (S609). With regard to the characters in the image data of the cut-out written-in portion, the text conversion application 504 in the document managing system converts the cut-out image portion into text as character information (S610). The written-in note extracting application 503 stores the cut-out written-in note image in the written-in note image storage (S611). With regard to each of the written-in information, the written-in note classifying application 506 in the document managing system classifies the written-in notes according to colors of written-in notes, and associates the information with a writer (S612). And, the written-in note extracting application 503, the text conversion application 504, and the written-in note classifying application 506 respectively store information about write-in operation in the written-in information table 512 (S613).

Figure 18:
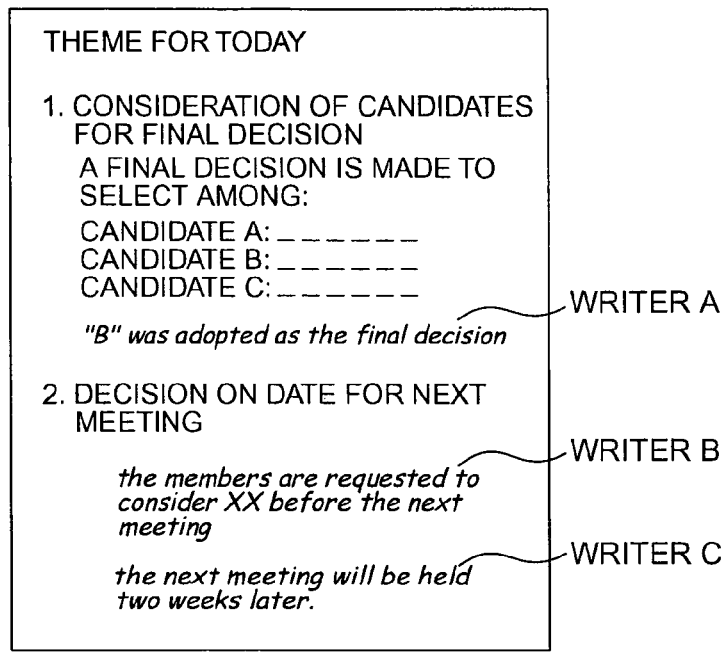
FIG. 18 is a diagram showing a sample of a paper document in which notes were written in different colors of writers.
Figure 19:
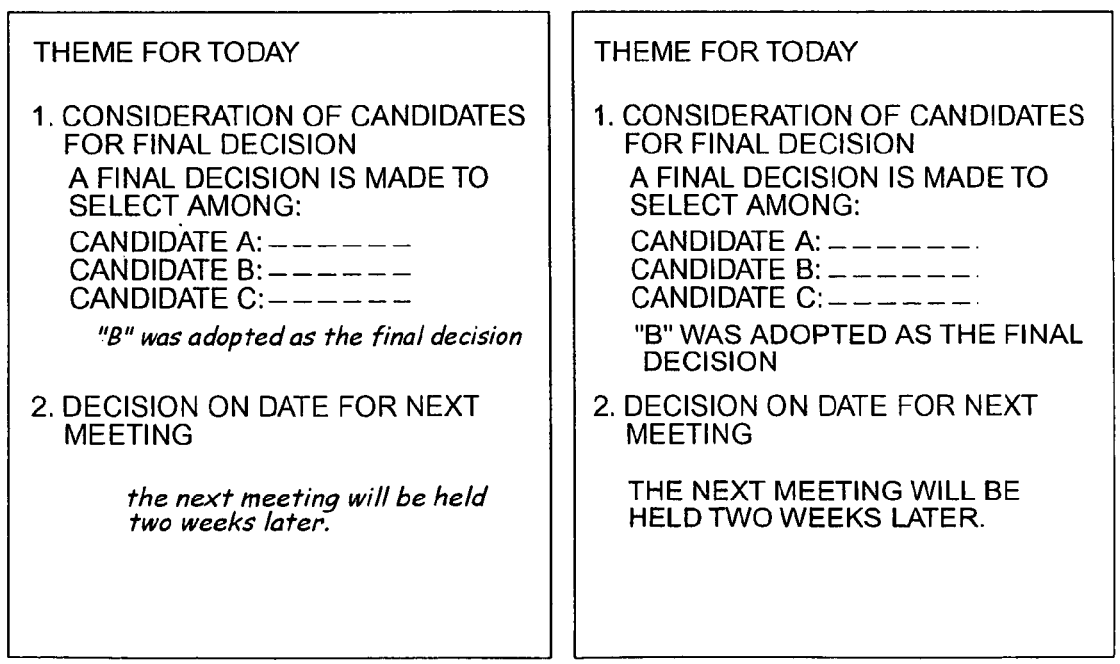
FIG. 19 is a diagram showing images of print documents in which written-in note of a specific writer are left behind in the sample document in FIG. 18.

In contrast to a sample document in FIG. 18, written-in information stored in the written-in information table is as shown in FIG. 15. Writer information (classification information) defined by the written-in note classifying application 506 is sent from the document managing system 400 to the composite device 402 through the composite device cooperation module 507 (S615). According to the received writer information, the composite device obtains print-item selection information about a document type to print which is selected on the user interface screen in FIG. 17, and sends the print-item selection information to the document managing system 401 through the document managing system cooperation module 603 (S616). The print-item selection information includes writer selection information to select a writer as a printing object ("Writer A", "Writer C", for example) and also includes print-form selection information with regard to a document only of written-in notes and a document in which written-in notes have been reflected, such as "Handwritten" for printing handwritten notes on a paper document as written-in information and "Text" for printing a character string in text form. After receiving the print-item selection information, the document managing system calls an electronic document identified in S604 (S617), and if the writer as the printing object has been selected in the writer selection information, lays out the written-in note on the electronic document and generates a print document (S618, S619). As a generated document is transmitted to the composite device and a print document is printed, a print document carrying only associated specific written-in notes is output (S620). In the print document generating process in S619, the process proceeds according to the flowchart in FIG. 8 described in the first embodiment or the FIG. 13. As opposed to a sample document in FIG. 18, FIG. 19 shows an output image of a print document which has only written-in note by a specific writer left behind.

In the second embodiment, written-in information is classified by colors assigned to writers, but by using different colors in writing according to such a standard as the kinds of content or the degrees of importance of notes, another type of classification of written-in notes can be realized by the same method as in the second embodiment.

By using the above-described flowchart, the process of the second embodiment can be realized.

Embodiment 3

As a third embodiment of the present invention, description will be made of a document processing apparatus for extracting a written-in note by comparing a previously stored electronic document with a paper document on which a note has been written, setting an access right to each of written-in information, and printing a document which conforms to the user's right.

Figure 20:
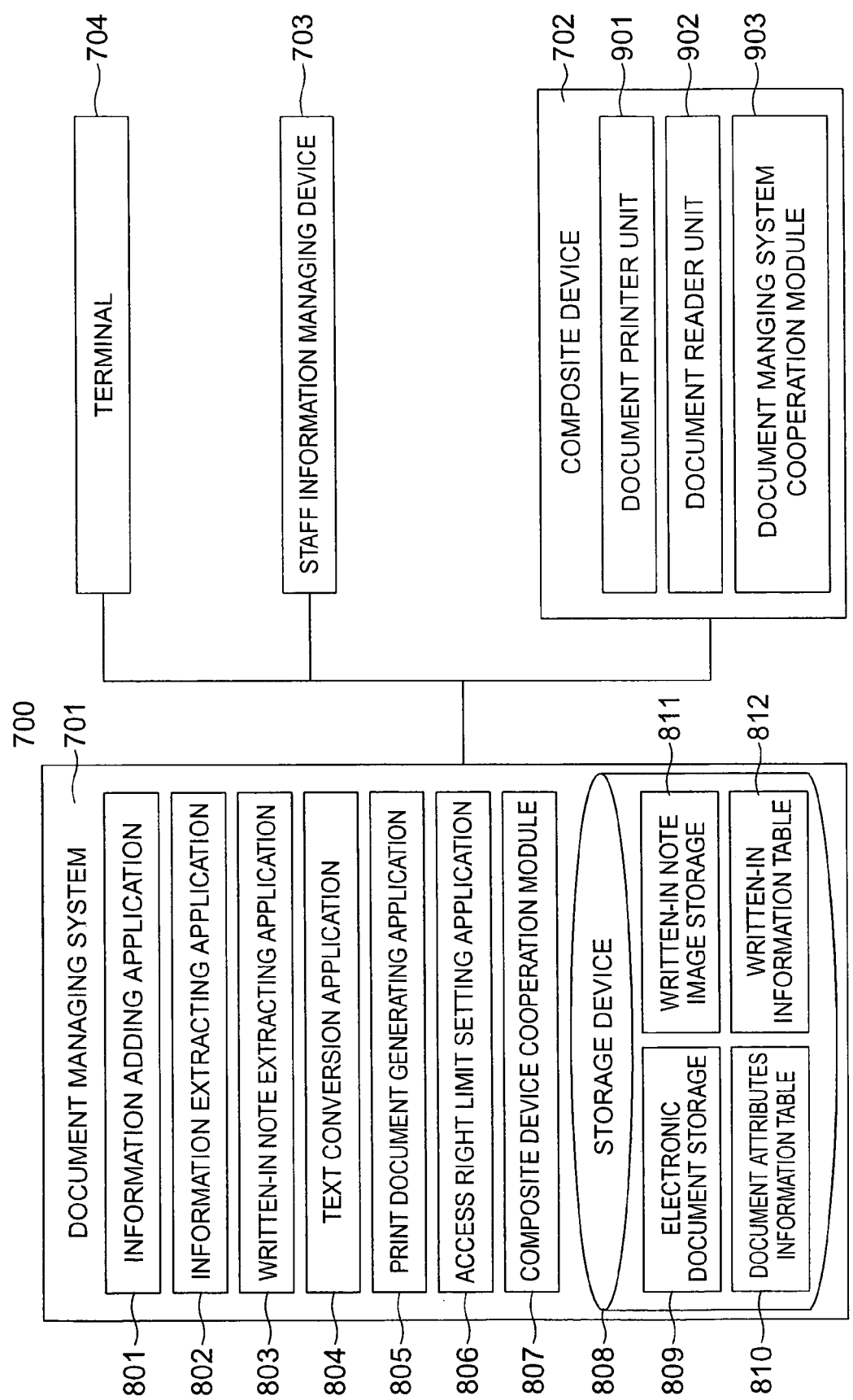
FIG. 20 is a block diagram showing a functional composition of a document processing apparatus 700 in a third embodiment.

FIG. 20 is a block diagram showing a functional composition of a document processing apparatus 700 in a third embodiment of the present invention. The document processing apparatus 700 includes a document managing system 701, a composite device 702, a staff information managing device 703, and a terminal 704. Those devices can communicate data to one another across a network(s). As for configuration of those devices, a plurality of devices may be combined to form a set of equipment or they may be configured into separate sets of equipment. However, in whatever form they may be configured, they must be able to communicate data with one another across a network(s).

The document managing system 701 includes an information adding application 801, an information extracting application 802, a written-in note extracting application 803, a text conversion application 804, a print document generating application 805, an access right setting application 806, a composite device cooperation module 807, an electronic document storage 809 in the storage device 808, a document attributes information table 810, a written-in note image storage 811, and a written-in information table 812. Like in the first embodiment, in the devices of this embodiment, the applications denote programs that run on the computer and the module denotes a program that needs communication across a network(s).

Among the various functions, those whose names were found in the first embodiment perform the same functions as were described in the first embodiment, namely, the information adding application 801, the information extracting application 802, the written-in note extracting application 803, the text conversion application 804, the print document generating application 805, the composite device cooperation module 807, the electronic document storage 809 in the storage device 808, the document attributes information table 810, the written-in note image storage 811, and the written-in information 812, with one exception that the written-in information table 812 has three more column headings—Access right, Access limit starting date, and Access limit ending date—added to it than in the written-in information table 211 described in the first embodiment (FIG. 21), and with another exception that the document managing system has an access right setting application 806 added to those functions listed above. This application sets access right information (access right, access limit starting date, access limit ending date) for every written-in information received from the composite device.

The composite device 702 includes a document printer unit 901, a document reader unit 902, and a document managing system cooperation module 903. With regard to the functions of those units, those units which have the same names perform the same functions as were described in the first embodiment.

The staff information managing device 703 manages official post information about users (staffs) of the terminal.

The terminal 704, like the composite device 702, performs the same function as that in the first embodiment.

Description will now be made of the flow of the process in the third embodiment in the document processing apparatus described above.

The process of adding a document ID and document version information to an electronic document stored in the document managing system and printing a paper document is realized by the same process as in FIG. 4 in the first embodiment.

With regard to written-in notes on a paper document printed as described, description will be made of a process for setting an access right, an access limit starting date, and an access limit ending data to each written note. To show an output image generated by a series of processes, a sample of a paper document to be read is presented in FIG. 26.

FIG. 22 is a flowchart of a process of setting an access right, an access limit starting date, and an access limit ending data to each written note on a paper document.

To describe the above-mentioned flowchart, in S701, image information, generated by having a paper document with some written note read by the document reader unit 902, is received from the composite device 702. In S702, S703, and S704, the information extracting application 802 in the document managing system identifies an electronic document (S704) by extracting a document ID and a document version from paper-document image information received from the composite device (S702), and obtaining a storage area of the relevant electronic document from the document attributes information table by using the two items of information (S703). Then, the written-in note extracting application 803 in the document managing system compares the paper-document image information with a identified electronic document, and extracts the written-in information (S705). With regard to the extracted written-in information, in S706, a process of storing the written-in note image and information is carried out. The storage process of written-in note image and information is executed by following the flowchart in FIG. 7 as described in the first embodiment.

After this, the document managing system transmits the written-in information, extracted by the written-in note extracting application 803, to the composite device 702 through the composite device cooperation module 807 (S707). Based on each written-in information received, the composite device obtains access right information (access right, access limit starting date, and access limit ending date) for each written-in information selected from the user interface shown in FIG. 23, and transmits the access right information to the document managing system 701 through the document managing system cooperation module 903 (S708).

At the user interface in FIG. 23, image data (handwritten) and text are output as written-in information to written-in notes on the screen image for setting an access right to each written-in note. With regard to setting an access limit starting date and an access limit ending date, the spaces may be kept blank. If the spaces for both the access limit starting date and the access limit ending date are kept blank, this means that access limit are set for an indefinite time. Further, if an access limit starting date is input and an access limit ending date is not input, this means that a date on which an access limit starts is set and an indefinite duration of limit is set. Similarly, if a date on which access limit starts to be effective is not input and an access limit ending data is input, this means that access control is started when an access limit is set and a date for terminating the access limit is set. After this, after access right information is received, the access right setting application 806 in the document managing system stores this information in the relevant written-in information in the written-in information table 812, and sets an access limit.

A process for, in response to a request to print a document with a note written in it, printing a document compatible with an access right set for each written-in information will be described.

FIG. 24 is a flowchart of a process for, in response to a request to print a document with a note written in it, printing a document compatible with an access right set for each written-in information.

To describe the above flowchart, the document managing system 701 receives document information about a document with note written therein, which the user wants to print and print-form selection information ("Handwritten" for printing a written note on a paper document or "Text" for printing a character string in text form) as a request to print an electronic document from the terminal, and also receives official post information about the user from the staff information managing device 703 through the terminal. By using the document information received, the following processes are repeated for each of written-in information to be printed (S806). Written-in information about a document having note written therein to be printed is obtained from the written-in information table 812 (S802). With regard to the obtained written-in information, the document managing system 701 compares the official post information received from the terminal with the access right (S803), and when the access right is complied with, performs a process of generating a print document (S805), but if the access right is not complied with, decides whether the access limit period is effective from the access limit starting date and the access limit ending date, and when the access limit period is not effective, performs the process of generating a print document (S805).

The process for generating a print document will be described in detail (S805).

Figure 25:
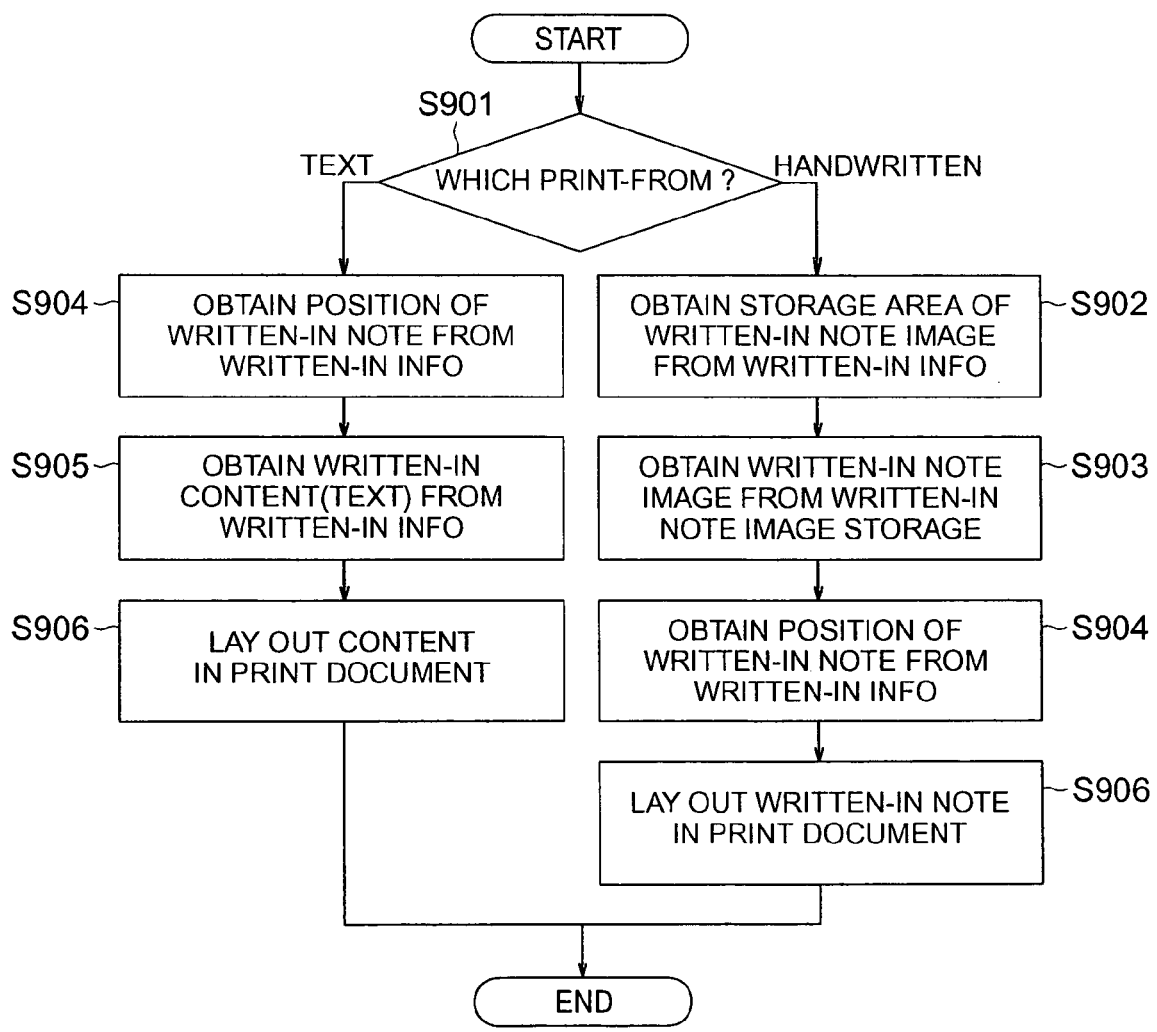
FIG. 25 is a flowchart showing a process of generating a print document in the third embodiment (S805)

FIG. 25 is a flowchart showing a process of generating a print document (S805). When generating a print document, the flow of the process differs with the content of the print-form selection information received from the terminal (S901).

When the print-form selection information is "Handwritten", the document managing system obtains a storage area of written-in note image from the written-in information obtained from the written-in information table 812 in S802 (S902), also obtains written-in image data from the written-in note image storage (S903), and then, obtains position information about the written-in information (S904), and lays out written-in note image data in a print document according to the obtained position information (S906).

When the print-form selection information is "Text", the document managing system obtains position information and written-in content (text) from the written-in information obtained from the written-in information table in S802 (S904, S905), and lays out the obtained written-in content (text) in a print document according to the position information (S906).

With regard to the layout of the written-in content in the print document (S906), a process of adjusting the layout position of the written-in information is performed by following the flowchart in FIG. 13 as described in the first embodiment.

Figure 26:
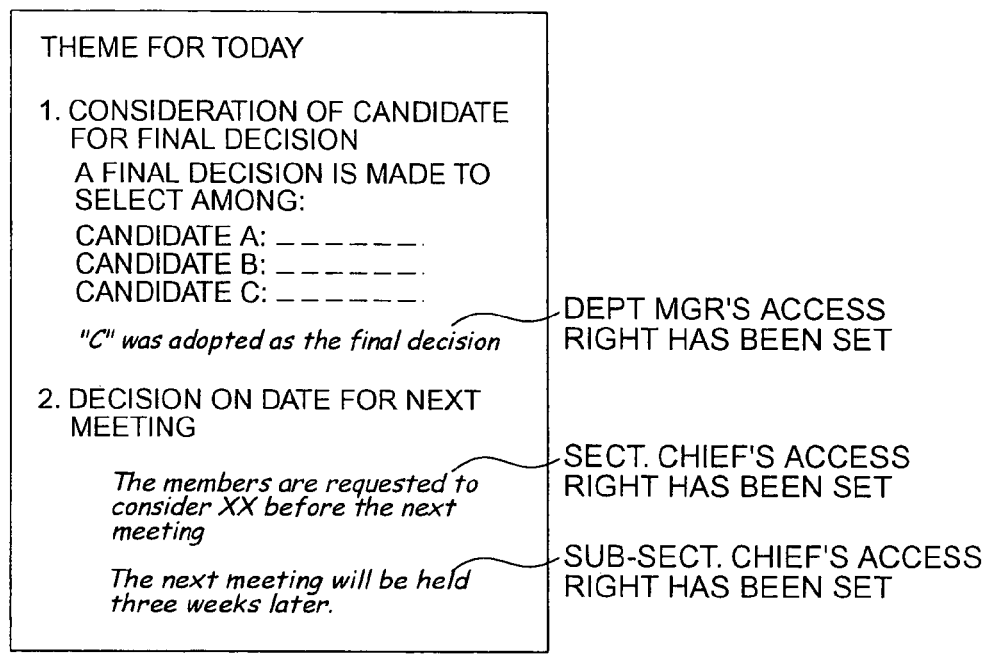
FIG. 26 is a diagram showing a sample of a paper document, in which some note has been written which requires the access right to be set.
Figure 27:
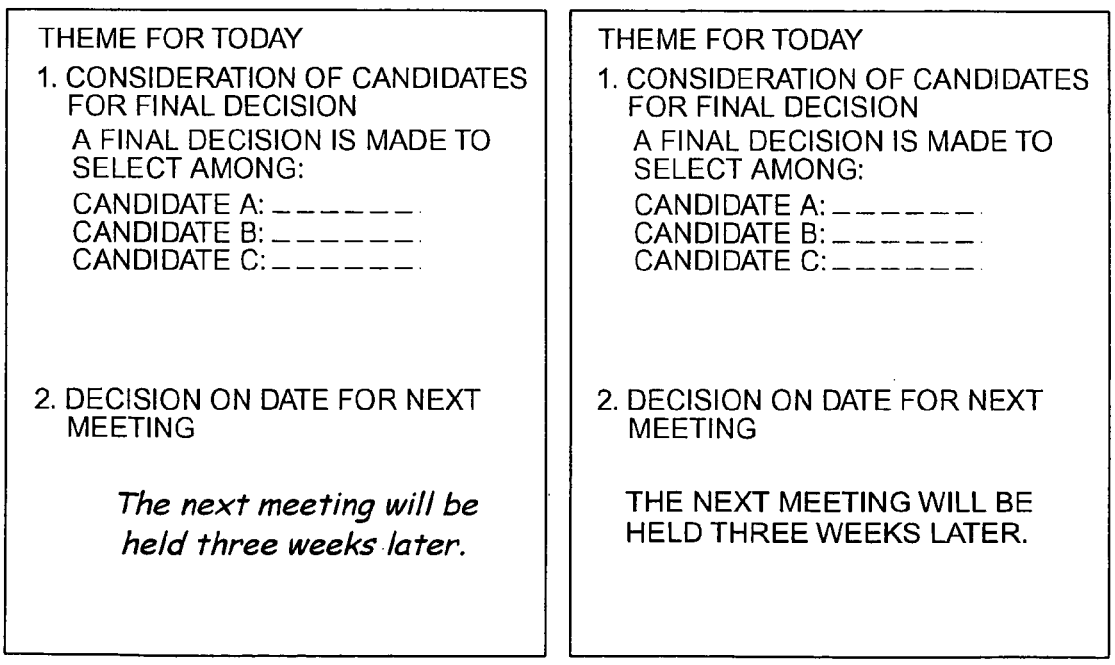
FIG. 27 is a diagram showing an output image of a print document compatible with the user's access right in the sample document in FIG. 26.

As opposed to a sample document in FIG. 26, an output image of a print document compatible with the access right of the user is shown in FIG. 27.

In the third embodiment, an access right is set to written-in information based on official post information of the staffs, and on the other hand, even in a division the user belongs, by using the same method as in the third embodiment, it is possible to realize a document processing apparatus which prints a document compatible with the right of the user. Moreover, when laying out written-in information, by providing a function to display written-in information in colors corresponding to access rights, it is possible to realize a document processing apparatus with more versatile functions.

According to those embodiments, by supplying a paper document with information for identifying an electronic document when printing an electronic document, it is possible to select a document only of written-in notes, a document of the original or an electronic document in which written-in notes have been reflected, and print a selected document, and by adding related information of a specific writer or access right information to written-in notes on a paper document, it is also possible to print a document having only a part of written-in notes left behind.

It is possible to address a print request from the user in a careful and elaborate manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A document processing apparatus for associating an electronic document stored in a storage device with written-in information added to a document which is a printer output of said electronic document, the apparatus comprising:

information adding means for adding identification information to the electronic document to identify said electronic document when printing said electronic document stored in said storage device;

document printing means for printing said document which has said identification information added;

document reading means for reading said printed document which has new written-in information added, and for generating image information;

information extracting means for extracting identification information added to said electronic document from said image information, and associating said stored electronic document with said image information;

receiving means for communicating with a composite device, for receiving print item selection information from the composite device and for outputting said received print item selection information, said print item selection information indicating any one of:
(a) only written-in information;
(b) only an original document; and
(c) a document in which written-in information has been reflected as a printing object;

written-in note extracting means coupled to said receiving means for receiving said print item selection information outputted from said receiving means and for, in a case wherein said print item selection information indicates either of only written-in information or a document in which written-in information has been reflected as a printing object, comparing the electronic document identified by identification information extracted by said information extracting means with said image information, extracting said written-in information newly added to the document, and storing said written-in information as image data, and wherein said written-in note extracting means does not compare the electronic document with said image information if the print item selection information indicates only an original document;

text conversion means for converting text-convertible written-in information out of said extracted written-in information into text data from one written-information after another, and storing said text data;

means for laying out said image data or text data of said stored written-in information on a print document, and generating a print document of a new output type; and means for outputting the generated print document to said composite device.

2. The document processing apparatus according to claim 1, wherein said means for generating a print document of said new output type includes means for adjusting a layout position of written-in information if a plurality of written-in information to be laid out in a print document lie one upon another on said print document.

3. The document processing apparatus according to claim 1, further comprising means for outputting said electronic document stored in the storage device to the composite device, with which the document processing apparatus is in communication, in a case wherein said print item selection information indicates only an original document as a printing object.

4. The document processing apparatus according to claim 2, wherein said written information extracting means classifies said extracted written-in information by writers, stores said extracted written-in information associated with corresponding writers.

5. The document processing apparatus according to claim 2, wherein said written-in note extracting means includes means for storing said extracted written-in information by selling an access right for each of said extracted written-in information, and wherein said document processing apparatus further comprises means for displaying a screen image for setting an access right for each of said written-in information.

6. The document processing apparatus according to claim 3, wherein said print item selection information further includes print-form selection information wherein said means for generating a print document of a new type, when generating a print document of an output type including said extracted written-in information, includes means for selectively laying out either image data of said written-in information or test in a print document based on said print-form selection information.

7. The document processing apparatus according to claim 4, wherein said print item selection information further includes writer selection information wherein said means for generating a print document of a new output type includes means for laying out on a print document written-in information by a specific writer or by a plurality of writers out of written-in information stored associated with matching writers based on said writer selection information.

8. The document processing apparatus according to claim 5, wherein said means for generating a print document of a new output type includes means for comparing the access right of a person requesting that a document be output with the access right set for each of written-in information, laying out only permissible written-in information on a print document, and generating a print document.

9. The document processing apparatus according to claim 5, wherein said means for generating a print document of a new output type includes means for comparing the access right of a person requesting that a document be output with the access right set for each of written-in information, laying out only permissible written-in information on a print document, and generating a print document.

10. The document processing apparatus according to claim 8, wherein said means for generating a print document of a new output type includes means for laying out written-in notes in colors corresponding to different access rights.

11. A document processing method in a document processing apparatus being in communication with a composite device, for associating an electronic document stored in a storage device with written-in information added to a document as a printer output of said electronic document, comprising the steps of:

adding identification information to the electronic document to identify said electronic document when printing said electronic when printing said electronic document stored in said storage device;

printing said electronic document with said identification information added to said electronic document;

reading said document formed by having new written-in information added to said printed document, and generating image information;

extracting identification information added to said electronic document from said image information, and associating said image information with the stored electronic document;

receiving print item selection information from the composite device, said print item selection information indicating any one of:
(a) only written-in information;
(b) only an original document; and
(c) a document in which written-in information has been reflected as a printing object;

in a case wherein said print item selection information indicates either of only written-in information or a document in which written-in information has been reflected as a printing object, comparing the electronic document identified by said extracted identification information with said image information, extracting said written-in information added newly, and storing image data of each of written-in information;

in a case wherein said print item selection information indicates only an original document, making a determination not to compare the electronic document with said image information;

converting text-convertible written-in information out of said extracted written-in information into text data from one written-in information after another, and storing text data in said storage device; and laying out said image data or said text data of said stored written-in information, and generating a print document of a new output type.

* * * * *